US012626591B2

(12) United States Patent
Wu

(10) Patent No.: US 12,626,591 B2
(45) Date of Patent: May 12, 2026

(54) DETECTION METHOD AND APPARATUS OF ABNORMAL VEHICLE, DEVICE, AND STORAGE MEDIUM

(71) Applicant: Beijing Zitiao Network Technology Co., Ltd., Beijing (CN)

(72) Inventor: Jie Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 336 days.

(21) Appl. No.: 18/262,806

(22) PCT Filed: May 9, 2022

(86) PCT No.: PCT/CN2022/091653
§ 371 (c)(1),
(2) Date: Jul. 25, 2023

(87) PCT Pub. No.: WO2022/262471
PCT Pub. Date: Dec. 22, 2022

(65) Prior Publication Data
US 2024/0071215 A1 Feb. 29, 2024

(30) Foreign Application Priority Data

Jun. 16, 2021 (CN) .......................... 202110667910.5

(51) Int. Cl.
*G08G 1/017* (2006.01)
*G06V 20/40* (2022.01)
(Continued)

(52) U.S. Cl.
CPC ........... *G08G 1/0175* (2013.01); *G06V 20/44* (2022.01); *G06V 20/52* (2022.01); *G08G 1/04* (2013.01)

(58) Field of Classification Search
CPC ........ G08G 1/0175; G08G 1/04; G06V 20/44; G06V 20/52; G06V 20/54
See application file for complete search history.

(56) References Cited

U.S. PATENT DOCUMENTS

2014/0348390 A1 11/2014 Liu et al.
2019/0108384 A1* 4/2019 Wang ................... G08G 1/0129
2023/0005272 A1* 1/2023 Li .......................... G06V 20/46

FOREIGN PATENT DOCUMENTS

CN 104376554 A 2/2015
CN 105160326 A 12/2015
(Continued)

OTHER PUBLICATIONS

ISA China National Intellectual Property Administration, International Search Report Issued in Application No. PCT/CN2022/091653, Jul. 22, 2022, WIPO, 5 pages.
(Continued)

*Primary Examiner* — Alazar Tilahun
(74) *Attorney, Agent, or Firm* — Alleman Hall LLP

(57) ABSTRACT

This disclosure provides a detection method and an apparatus of abnormal vehicle, device, and storage medium, wherein the detection method includes: obtaining a surveillance video of a target road; performing background modeling based on the surveillance video to obtain background images of at least partial video frames in the surveillance video; performing vehicle detection processing on the background images; and determining detection boxes located on the target road in the background images as detection boxes of abnormal vehicles with abnormal stop events.

17 Claims, 7 Drawing Sheets

Detection system of abnormal vehicle 100

(51) Int. Cl.
  *G06V 20/52* (2022.01)
  *G08G 1/04* (2006.01)

(56) References Cited

FOREIGN PATENT DOCUMENTS

| | | | |
|---|---|---|---|
| CN | 105868700 | A | 8/2016 |
| CN | 106778540 | A | 5/2017 |
| CN | 107292239 | A | 10/2017 |
| CN | 107491753 | A | 12/2017 |
| CN | 108335489 | A | 7/2018 |
| CN | 109285341 | A | 1/2019 |
| CN | 109934075 | A | 6/2019 |
| CN | 110705461 | A | 1/2020 |
| CN | 110705495 | A | 1/2020 |
| CN | 111009136 | A | 4/2020 |
| CN | 111368687 | A | 7/2020 |
| CN | 111369807 | A | 7/2020 |
| CN | 111696135 | A | 9/2020 |
| CN | 111832492 | A | 10/2020 |
| CN | 112200131 | A | 1/2021 |
| CN | 112749596 | A | 5/2021 |
| CN | 113361299 | A | 9/2021 |
| CN | 113409587 | A | 9/2021 |
| EP | 2578464 | A1 | 4/2013 |
| IN | 201641010240 | A | 3/2016 |

OTHER PUBLICATIONS

"Research on Traffic Abnormal Incident Detection Algorithm of Highway," Chinese Master's Thesis, Lanzhou Jiaotong University, Apr. 2017, 67 pages. Submitted with English abstract.

\* cited by examiner

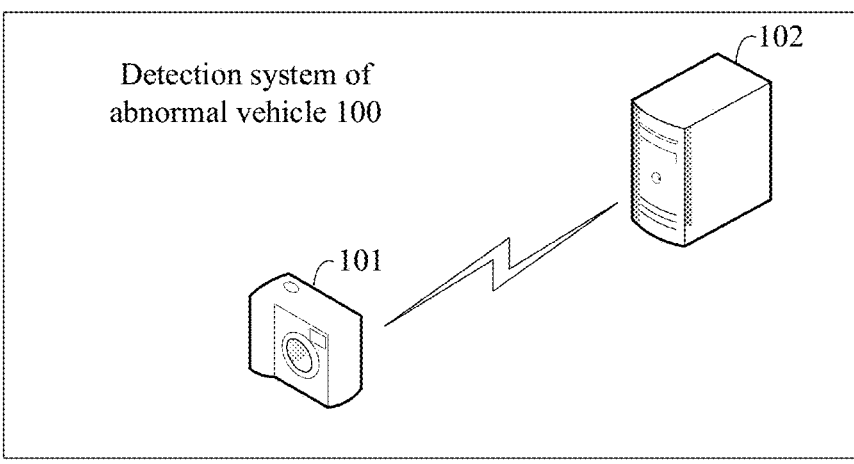

Detection system of
abnormal vehicle 100

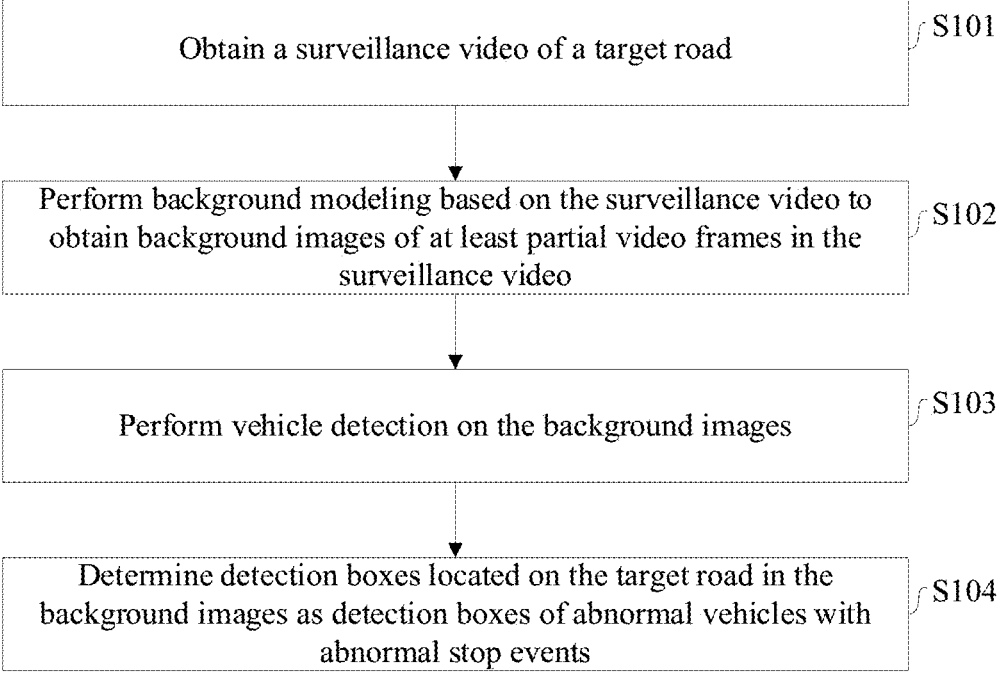

Obtain a surveillance video of a target road    S101

Perform background modeling based on the surveillance video to
obtain background images of at least partial video frames in the
surveillance video    S102

Perform vehicle detection on the background images    S103

Determine detection boxes located on the target road in the
background images as detection boxes of abnormal vehicles with
abnormal stop events    S104

Fig. 2

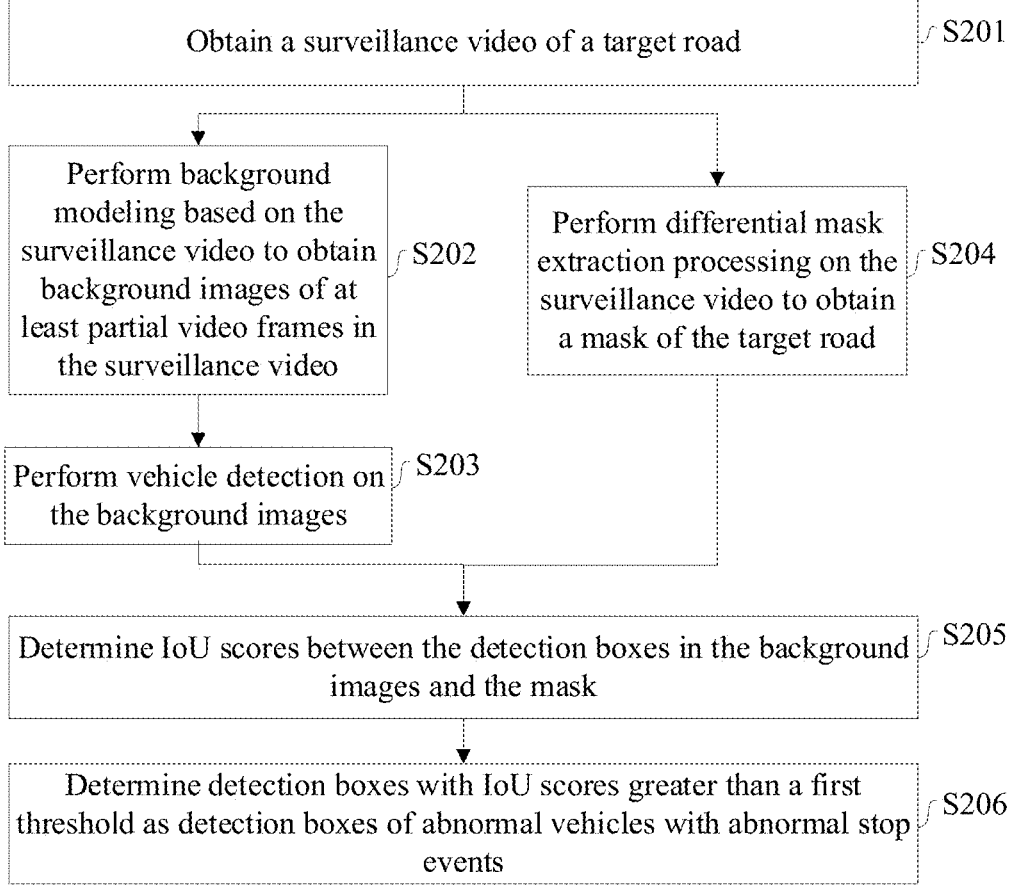

Obtain a surveillance video of a target road — S201

Perform background modeling based on the surveillance video to obtain background images of at least partial video frames in the surveillance video — S202

Perform differential mask extraction processing on the surveillance video to obtain a mask of the target road — S204

Perform vehicle detection on the background images — S203

Determine IoU scores between the detection boxes in the background images and the mask — S205

Determine detection boxes with IoU scores greater than a first threshold as detection boxes of abnormal vehicles with abnormal stop events — S206

Fig. 3

Video frame image400

402

403

401

Video frame image 400

402

403

404

401

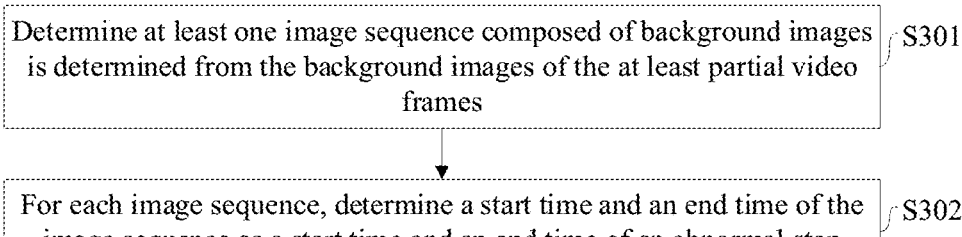

Determine at least one image sequence composed of background images is determined from the background images of the at least partial video frames ⌐S301

For each image sequence, determine a start time and an end time of the image sequence as a start time and an end time of an abnormal stop event corresponding to the image sequence ⌐S302

Fig. 6

For any two background images with a shooting interval less than a preset interval, calculate an IoU between a target detection box in one of the two background images and a target detection box in the other background image ⌐S3011

Determine a first target detection box in one of the two background images and a second target detection box in the other background image as detection boxes of a same abnormal vehicle in response to an IoU score between the first target detection box and the second target detection box being greater than a second threshold ⌐S3012

Add the one of the background images and the other background image to a same image sequence ⌐S3013

Fig. 7

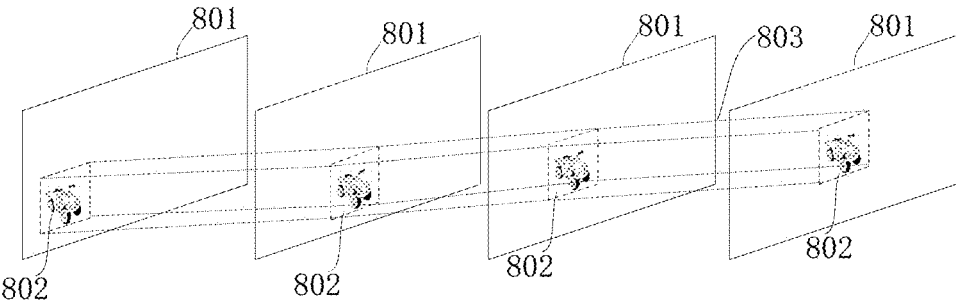

Fig. 8

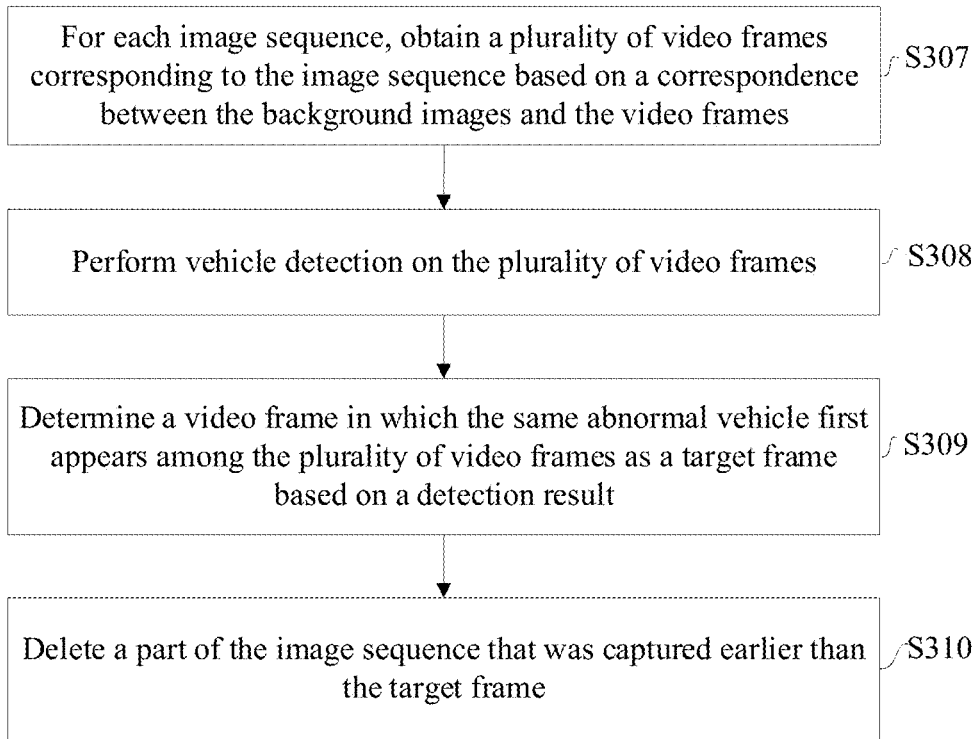

For each image sequence, obtain a plurality of video frames corresponding to the image sequence based on a correspondence between the background images and the video frames — S307

Perform vehicle detection on the plurality of video frames — S308

Determine a video frame in which the same abnormal vehicle first appears among the plurality of video frames as a target frame based on a detection result — S309

Delete a part of the image sequence that was captured earlier than the target frame — S310

Fig. 11

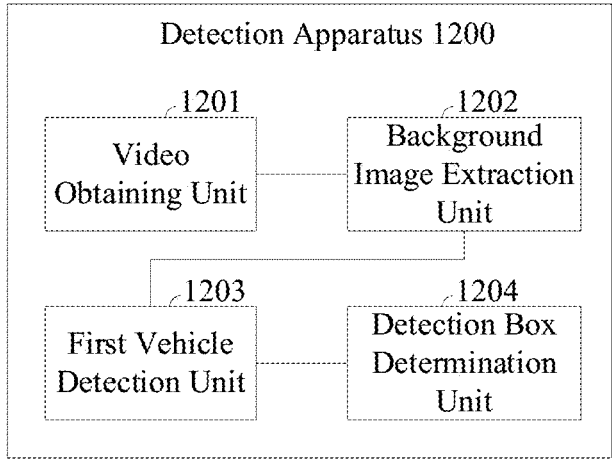

Detection Apparatus 1200

1201
Video Obtaining Unit

1202
Background Image Extraction Unit

1203
First Vehicle Detection Unit

1204
Detection Box Determination Unit

Fig. 12

DETECTION METHOD AND APPARATUS OF ABNORMAL VEHICLE, DEVICE, AND STORAGE MEDIUM

CROSS-REFERENCE TO RELATED APPLICATIONS

The present disclosure is based on and claims priority of Chinese application for invention No. 202110667910.5, filed on Jun. 16, 2021, the disclosure of which is hereby incorporated into this disclosure by reference in its entirety.

TECHNICAL FIELD

This disclosure relates to the technical field of image processing, in particular to a detection method and an apparatus of abnormal vehicle, device, and storage medium.

BACKGROUND

Relevant technologies usually use deep learning-based methods to detect abnormally stopped vehicles on roads. However, due to the relatively small number of samples of abnormally stopped vehicles and insufficient accuracy in sample labeling, relevant technologies can generally only use samples of normal driving vehicles to train detection models and identify significant behavior that deviates from normal driving conditions as abnormal stopping behavior.

SUMMARY

In an aspect, the present disclosure provides a detection method of abnormal vehicle, comprising:
obtaining a surveillance video of a target road;
performing background modeling based on the surveillance video to obtain background images of at least partial video frames in the surveillance video;
performing vehicle detection processing on the background images; and
determining detection boxes located on the target road in the background images as detection boxes of abnormal vehicles with abnormal stop events.
Optionally, the detection method further comprises:
performing differential mask extraction processing on the surveillance video to obtain a mask of the target road after the obtaining the surveillance video of the target road,
wherein the determining the detection boxes located on the target road in the background images as the detection boxes of the abnormal vehicles with the abnormal stop events comprises:
determining Intersections over Union (IoUs) between the detection boxes in the background images and the mask; and
determining detection boxes with IoUs greater than a first threshold as the detection boxes of the abnormal vehicles with the abnormal stop events.
Optionally, the detection method further comprises:
determining at least one image sequence composed of background images from the background images of the at least partial video frames after the determining the detection boxes located on the target road in the background images as the detection boxes of the abnormal vehicles with the abnormal stop events, wherein background images in a same image sequence comprise detection boxes of a same abnormal vehicle; and for each image sequence, determining a start time and an end time of the image sequence as a start time and an end time of an abnormal stop event corresponding to the image sequence, wherein the abnormal stop event corresponding to the image sequence is an abnormal stop event of a same abnormal vehicle corresponding to the image sequence.
Optionally, the determining the at least one image sequence composed of the background images from the background images of the at least partial video frames comprises:
for any two background images with a shooting interval less than a preset interval, calculating an IoU between a target detection box in one of the two background images and a target detection box in the other background image, the target detection boxes being the detection boxes of the abnormal vehicles; and
determining that a first target detection box in one of the two background images and a second target detection box in the other background image are detection boxes of a same abnormal vehicle in response to an IoU between the first target detection box and the second target detection box being greater than a second threshold; and
adding the one of the two background images and the other background image to a same image sequence.
Optionally, the at least one image sequence comprises a first image sequence and a second image sequence, the first image sequence corresponding to an abnormal stop event of a first abnormal vehicle, and the second image sequence corresponding to an abnormal stop event of a second abnormal vehicle, and the detection method further comprises:
before the determining the start time and the end time of the image sequence as the start time and the end time of the abnormal stop event corresponding to the image sequence for each image sequence, determining that a first abnormal stop event and a second abnormal stop event are a same abnormal stop event in response to an IoU between a detection box of the first abnormal vehicle in a first frame of the first image sequence and a detection box of the second abnormal vehicle in a first frame of the second image sequence being greater than a third threshold; and
combining the first image sequence and the second image sequence into one image sequence.
Optionally, the detection method further comprises:
for each image sequence,
performing vehicle detection on other video frames located before the image sequence in the surveillance video after the determining the at least one image sequence composed of the background images from the background images of the at least partial video frames;
deleting the detection boxes of the same abnormal vehicle from the image sequence in response to the other video frames comprising the detection boxes of the same abnormal vehicle corresponding to the image sequence,
wherein the determining the start time and the end time of the image sequence as the start time and the end time of the abnormal stop event corresponding to the image sequence for each image sequence is performed in response to the other video frames not comprising the detection boxes of the same abnormal vehicle corresponding to the image sequence.
Optionally, the detection method further comprises:
for each image sequence, obtaining a plurality of video frames corresponding to the image sequence based on a correspondence between the background images and the video frames before the determining the start time and the end time of the image sequence as the start time and the end time of the abnormal stop event corresponding to the image sequence for each image sequence;

performing vehicle detection on the plurality of video frames;

determining a video frame in which the same abnormal vehicle first appears among the plurality of video frames as a target frame based on a detection result; and deleting a part of the image sequence that was captured earlier than the target frame.

Optionally, the detection method further comprises:

determining multiple abnormal stop events with start times within a preset period of time as the same abnormal stop event after the determining the start time and the end time of the image sequence as the start time and the end time of the abnormal stop event corresponding to the image sequence for each image sequence; and determining an earliest start time and a latest end time corresponding to the multiple abnormal stop events as a start time and an end time of the same abnormal stop event.

In another aspect, the present disclosure provides an abnormal vehicle detection apparatus, comprising:

a video obtaining unit for obtaining a surveillance video of a target road;

a background image extraction unit for performing background modeling based on the surveillance video to obtain background images of at least partial video frames in the surveillance video;

a first vehicle detection unit for performing vehicle detection processing on the background images; and a detection box determination unit for determining detection boxes located on the target road in the background images as detection boxes of abnormal vehicles with abnormal stop events.

Optionally, the apparatus further comprises:

a mask extraction unit for performing differential mask extraction processing on the surveillance video to obtain a mask of the target road;

the detection box determination unit comprises:

a first IoU calculation subunit for determining IoUs between the detection boxes in the background images and the mask;

a detection box determination subunit for determining detection boxes with IoUs greater than a first threshold as the detection boxes of the abnormal vehicles with the abnormal stop events.

Optionally, the apparatus further comprises:

an image sequence construction unit for determining at least one image sequence composed of background images from the background images of the at least partial video frames, wherein background images in a same image sequence comprise detection boxes of a same abnormal vehicle; and an abnormal stop event determination unit for, for each image sequence, determining a start time and an end time of the image sequence as a start time and an end time of an abnormal stop event corresponding to the image sequence, wherein the abnormal stop event corresponding to the image sequence is an abnormal stop event of a same abnormal vehicle corresponding to the image sequence.

Optionally, the image sequence construction unit comprises:

a second IoU calculation subunit for, for any two background images with a shooting interval less than a preset interval, calculating an IoU between a target detection box in one of the two background images and a target detection box in the other background image, the target detection boxes being the detection boxes of the abnormal vehicles;

a detection box correlation subunit for determining that a first target detection box in one of the two background images and a second target detection box in the other background image are detection boxes of a same abnormal vehicle in response to an IoU between the first target detection box and the second target detection box being greater than a second threshold;

an image sequence combination subunit for adding the one of the two background images and the other background image to a same image sequence.

Optionally, the at least one image sequence comprises a first image sequence and a second image sequence, the first image sequence corresponding to an abnormal stop event of a first abnormal vehicle, and the second image sequence corresponding to an abnormal stop event of a second abnormal vehicle; the detection apparatus further comprises:

an abnormal stop event merge unit for determining that a first abnormal stop event and a second abnormal stop event are a same abnormal stop event in response to an IoU between a detection box of the first abnormal vehicle in a first frame of the first image sequence and a detection box of the second abnormal vehicle in a first frame of the second image sequence being greater than a third threshold;

an image sequence combination unit for combining the first image sequence and the second image sequence into one image sequence.

Optionally, the apparatus further comprises:

a second vehicle detection unit for, for each image sequence, performing vehicle detection on other video frames located before the image sequence in the surveillance video;

a detection box deletion unit for deleting the detection boxes of the same abnormal vehicle from a target image sequence in response to the other video frames comprising the detection boxes of the same abnormal vehicle corresponding to the image sequence; and an abnormal stop event determination unit for determining the start time and the end time of the image sequence as the start time and the end time of the abnormal stop event corresponding to the image sequence for each image sequence in a case where the other video frames do not comprise the detection boxes of the same abnormal vehicle corresponding to the image sequence.

Optionally, the apparatus further comprises:

a video frame obtaining unit for, for each image sequence, obtaining a plurality of video frames corresponding to the image sequence based on a correspondence between the background images and the video frames;

a third vehicle detection unit for performing vehicle detection on the plurality of video frames;

a target frame determination unit for determining a video frame in which the same abnormal vehicle first appears among the plurality of video frames as a target frame based on a detection result; and a deletion unit for deleting a part of the image sequence that was captured earlier than the target frame.

Optionally, the apparatus further comprises: an abnormal stop event combination unit for determining multiple abnormal stop events with start times within a preset period of time as the same abnormal stop event; and determining an earliest start time and a latest end time corresponding to the multiple abnormal stop events as a start time and an end time of the same abnormal stop event.

In still another aspect, the present disclosure provides a computer device, comprising:

a memory; a processor coupled to the memory, the processor configured to, based on instructions stored in the memory, carry out the detection method described in any of the above aspects.

In still another aspect. the present disclosure provides a non-transitory computer-readable storage medium stored thereon a computer program that, when executed by a processor, implement the detection method described in any of the above aspects.

In still another aspect, the present disclosure provides a computer program, comprising: instructions that, when executed by a processor, cause the processor to execute the detection method described in any of the above aspects.

In still another aspect, the present disclosure provides a computer program product including instructions that, when executed by a processor, cause the processor to execute the detection method described in any of the above aspects.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present disclosure or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

FIG. 1 is a schematic structural diagram of a detection system of abnormal vehicle provided in an embodiment of the present disclosure;

FIG. 2 is a flowchart of a detection method of abnormal vehicle provided in an embodiment of the present disclosure;

FIG. 3 is a flowchart of a detection method of abnormal vehicle provided in another embodiment of the present disclosure;

FIG. 6 is a flowchart showing some steps of the detection method of abnormal vehicle provided in an embodiment of the present disclosure;

FIG. 7 is a flowchart of a method for determining an image sequence provided in some embodiments of the present disclosure;

FIG. 8 is a schematic diagram of an image sequence provided in an embodiment of the present disclosure;

6

Figure 13:
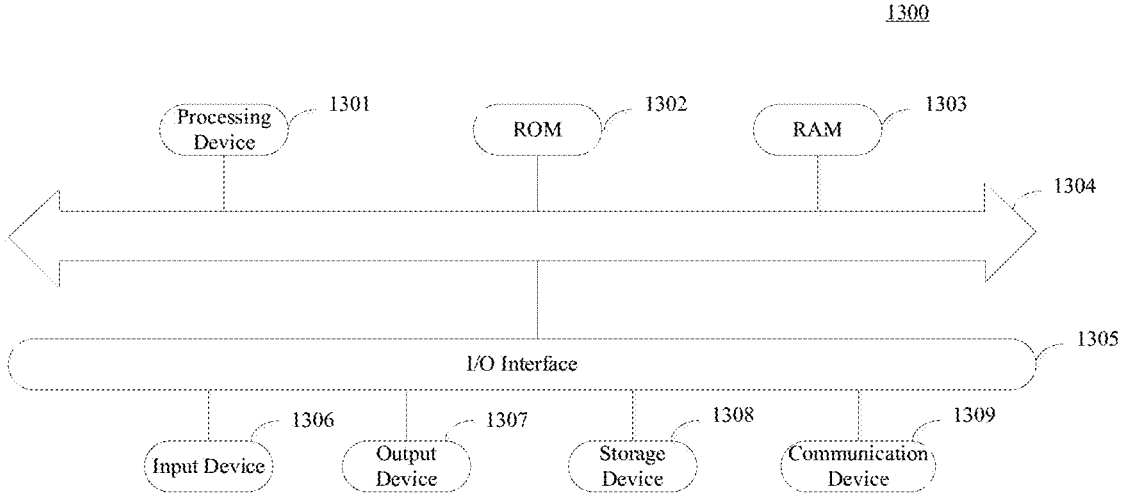

FIG. 11 is a flowchart showing some steps of the detection method of abnormal vehicle provided in some embodiments of the present disclosure;

FIG. 12 is a schematic structural diagram of an abnormal vehicle detection apparatus provided in an embodiment of the present disclosure;

FIG. 13 is a schematic structural diagram of a server according to an embodiment of the present disclosure.

DETAILED DESCRIPTION

In order to better understand the above objects, features and advantages of the present disclosure, the scheme of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure and are not all of embodiments thereof.

The methods used in related technologies are liable to identify some normal driving behavior as abnormal stop behavior, and the deep learning methods can only be applied to scenes that are homogeneous with the training samples, and may have poor accuracy in the face of unknown scenes. In order to solve or at least partially solve the above technical problem, the present disclosure provides a detection method of abnormal vehicle, apparatus, device, and storage medium.

FIG. 1 is a schematic structural diagram of a detection system of abnormal vehicle provided in an embodiment of the present disclosure. As shown in FIG. 1, the detection system of abnormal vehicle 100 may comprise at least one image acquisition device 101, as well as a computer device 102 connected in communication to the image acquisition device 101.

The image acquisition device 101 can be mounted on an equipment tower or a high-rise building on a side of a target road to capture the target road and obtain surveillance videos of the target road. The road monitored by the image acquisition device 101 is called the target road, which may be, but is not limited to, a main road, a vehicle intersection, a traffic accident prone section, etc.

The computer device 102 is used to store and process the surveillance videos of the target road, identifying abnormal vehicles in the surveillance videos that have experienced abnormal stop events. Abnormal vehicles are vehicle that have been stopped on the road for more than a preset threshold, such as vehicles involved in traffic accidents. Exemplary, the computer device 102 in the present disclosure can be understood as a device with storage and image processing functions, such as a server or server cluster.

FIG. 2 is a flowchart of a detection method of abnormal vehicle provided in an embodiment of the present disclosure. For example, the method can be executed by the computer device shown in FIG. 1. As shown in FIG. 2, in an embodiment, the detection method of abnormal vehicle can comprise steps S101-S104.

In step S101, a surveillance video of a target road is obtained.

The surveillance video of the target road can be understood as a video of the target road captured by the image acquisition device during a certain period of time. The surveillance video of the target road comprises both static and moving objects. The static objects can comprise green bands, guardrails, lane lines, and various road signs, as well as vehicles that have been stopped on the road for more than a preset threshold. The moving objects can comprise vehicles, pedestrians, etc. that are moving normally on the target road.

In an embodiment of the present disclosure, the computer device obtains the surveillance video of the target road by loading it from local memory, or by downloading it from the image acquisition device or other devices. It should be noted that the method of the obtaining the surveillance video in this embodiment is not limited to loading it from local memory and downloading it from other devices as mentioned above, and may comprise other methods known in the art.

In step S102, background modeling is performed based on the surveillance video to obtain background images of at least partial video frames in the surveillance video.

In each video frame of the surveillance video, pixels representing static objects described above constitute a background image of the video frame, and pixels representing moving objects described above constitute a foreground image of the video frame.

Background modeling is performed based on the surveillance video to obtain the background images of at least partial video frames in the surveillance video, which comprises comparing pixels of adjacent video frames in the surveillance video frame, wherein pixels in adjacent video frames that have not changed are determined as pixels of the background image, so as to obtain the background images. The background modeling method in this embodiment, which is similar to that in the relevant techniques, can be either a forward or a backward background modeling method, which will not be repeated here.

It should be noted that the background modeling algorithm used in this embodiment is not limited to the forward or backward background modeling algorithms mentioned above, but can also comprise various known background modeling algorithms in the field of image processing.

In step S103, vehicle detection is performed on the background images.

In an embodiment of the present disclosure, a preset vehicle detection model is used to perform vehicle detection on the background images to obtain the vehicles in the background images. Vehicles in the background images are vehicles that experienced abnormal stop events. Since the vehicles were stopped on the road, during background modeling, the vehicles are retained as the background in the background images.

The vehicle detection model is a model that is trained using vehicle sample images to recognize vehicles in images. In an application of the embodiment of the present disclosure, the vehicle detection model used can be understood as, but is not limited to, the Cascader R-CNN model. The Cascader R-CNN model is a multi-level target detection model that can avoid overfitting in the training process of the vehicle detection model and quality mismatch in the inference process.

It should be noted that the vehicle detection model used in this embodiment is not limited to the Cascader R-CNN model. In other applications of the embodiment of the present disclosure, the vehicle detection model may be other models known in the art.

If a vehicle is detected on a background image using the vehicle detection model, a detection box of the smallest size that can contain the vehicle is formed on the background image. In a specific application of this embodiment, the detection box may be a rectangular box.

In some embodiments of the present disclosure, after identifying a detection box of a vehicle, the vehicle recognition model may also output a confidence level on the estimate that the detection box corresponds to a vehicle. In practical applications, detection boxes with predicted confidence levels lower than a preset threshold can be deleted, remaining only detection boxes with confidence levels greater than the preset threshold.

In step S104, detection boxes located on the target road in the background images are determined as detection boxes of abnormal vehicles with abnormal stop events.

Since the objects in the background images are all static objects, it can be determined that a vehicle is stationary if the vehicle is identified from a background image. A stationary vehicle located on the target road can be understood as an abnormal vehicle with an abnormal stop event. Therefore, the detection box of a vehicle identified from the background image and located on the target road can be determined as the detection box of an abnormal vehicle with an abnormal stop event.

The detection method of abnormal vehicle provided in this embodiment comprises obtaining the background images of the at least partial video frames in the surveillance video by performing background modeling on the obtained surveillance video of the target road, and then performing vehicle detection on the background images using a vehicle recognition model to determine detection boxes located on the target road in the background images as detection boxes of abnormal vehicles with abnormal stop events, capable of improving the accuracy of abnormal vehicle detection.

Compared to the method of inputting a surveillance video into a pre-trained abnormal vehicle recognition model and recognizing abnormal vehicles in the video directly using the abnormal vehicle recognition model, the detection method of abnormal vehicle provided in this embodiment can overcome the problem of a smaller number of abnormal vehicle samples and the poor recognition ability of abnormal vehicle recognition model in unknown scenes.

FIG. 3 is a flowchart of a detection method of abnormal vehicle provided in another embodiment of the present disclosure. As shown in FIG. 3, in another embodiment of the present disclosure, the detection method of abnormal vehicle comprises steps S201-S206. The execution and beneficial effects of steps S201 to S203 are similar to those of steps S101-S103 described above. Only steps S204 to S206 will be specifically described here, and reference can be made to the previous description for the other steps.

In step S201, a surveillance video of a target road is obtained.

In step S202, background modeling is performed based on the surveillance video to obtain background images of at least partial video frames in the surveillance video.

In step S203, vehicle detection is performed on the background images.

In step S204, differential mask extraction processing is performed on the surveillance video to obtain a mask of the target road.

A mask is a selector used to selecting a specific area of an image. The mask of the target road is a mask used to select the target road in each video frame of the surveillance video.

In some practical applications of this embodiment, in addition to the area of the target road, each video frame of the surveillance video may also comprise areas of buildings adjacent to the target road. The areas of adjacent buildings may be parking lots, but the vehicles in the parking lots are not abnormal vehicles for the purpose of this embodiment.

In this embodiment, by setting a mask for the target road and using the mask of the target road to exclude vehicle detection boxes outside the target road, the problem of identifying vehicles outside the target road as abnormal vehicles can be avoided.

In an embodiment of the present disclosure, performing differential mask extraction processing on the surveillance video may comprise: selecting two video frames in the surveillance video and comparing pixels at a same position of the two video frames, if a change occurs for the pixels at the same position, determining that this position is a position on the target road, thereby determining a mask of the target road by continuous analysis and comparison.

For example, in an application of this disclosure, one video frame can be selected every 5 frames for a surveillance video, and is used as a video frame in mask determination. Then, pixels extracted at a same position of two adjacent video frames are compared. If a difference between the pixels at the same position exceeds a preset threshold, the position is determined to be on the target road. A mask of the target road can be determined by continuous analysis and comparison.

Figure 4:
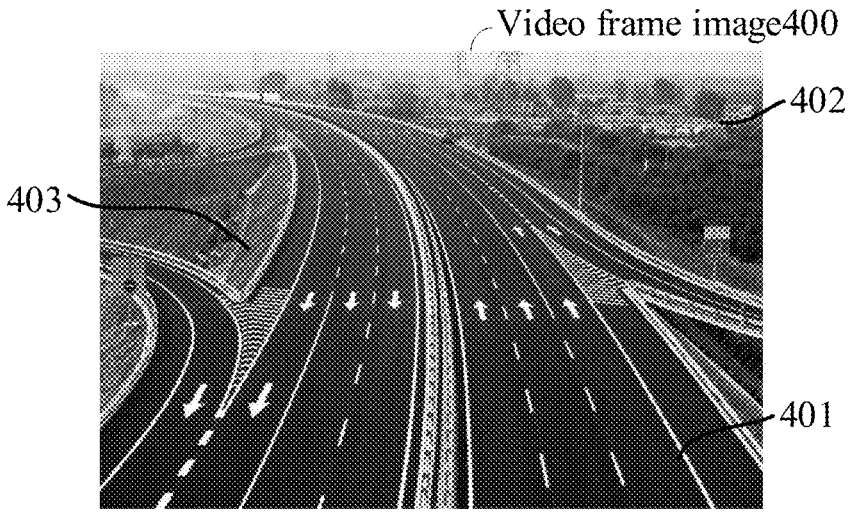
FIG. 4 shows a video frame image of a surveillance video provided in an embodiment of the present disclosure.
Figure 5:
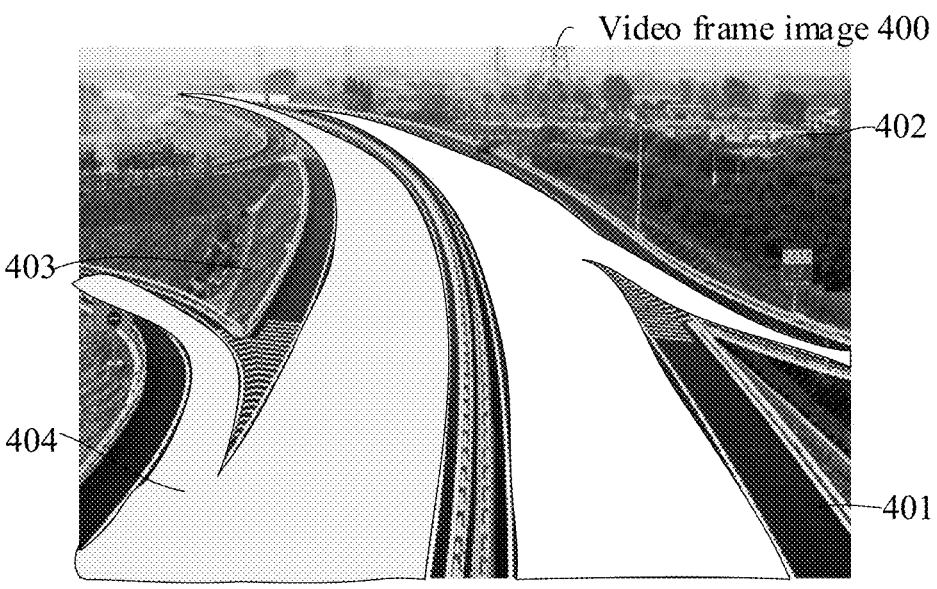
FIG. 5 shows a mask of a target road obtained for the target road shown in FIG. 4.

FIG. 4 shows a video frame image of a surveillance video provided in an embodiment of the present disclosure. FIG. 5 shows a target road mask obtained for the target road shown in FIG. 4. As shown in FIG. 4, in addition to a target road 401, the video frame image 400 also comprises buildings 402 on one side of the target road 401 and a green band 403 on another side of the target road 401. As shown in FIG. 5, by comparing the video frames in the surveillance video, a mask 404 of the target road can be obtained, and the area of the mask is the area of the target road in the video frame.

It should be noted that step S204 provided in this embodiment can be executed before or after steps S202-S203, or can be executed in parallel with steps S202-S203.

In S205, IoUs between the detection boxes in the background images and the mask are determined.

In order to determine the IoU between a detection box in the background image and the mask, it is necessary to first determine an intersection and a union of the detection box and the mask, respectively, and then calculate a ratio of the intersection to the union as the IoU between the detection box in the background image and the mask.

In S206, detection boxes with IoUs greater than a first threshold are determined as detection boxes of abnormal vehicles with abnormal stop events.

The first threshold can be specified as needed. If a IoU between a detection box and the mask of the target road is greater than the first threshold, it indicates that at least most of the detection box is located in the mask of the target road, that is, the vehicle is located in the target road, and the detection box of the vehicle can be determined as a detection box of an abnormal vehicle that has experienced an abnormal stop event.

In the detection method of abnormal vehicle provided in the embodiment of the present application, detection boxes of abnormal vehicles are determined using the mask of the target road and the detection boxes in the background images, which can avoid the problem of identifying vehicles in non-target road areas as abnormal vehicles.

FIG. 6 is a flowchart showing some steps of the detection method of abnormal vehicle provided in an embodiment of the present disclosure. As shown in FIG. 6, in some embodiments of the present disclosure, after determining the detection boxes in the background images located on the target road as the detection boxes of the abnormal vehicles that have experienced the abnormal stop events, i.e. after the execution of the above steps S101-S104 or S201-S206, the method may further comprise steps S301-S302.

In step S301, at least one image sequence composed of background images is determined from the background images of the at least partial video frames.

The background images located in the same image sequence comprise detection boxes of a same abnormal vehicle, and the background images are sorted according to the shooting time of the corresponding video frames.

FIG. 7 is a flowchart of a method for determining an image sequence provided in some embodiments of the present disclosure. As shown in FIG. 7, in some embodiments of the present disclosure, the method for determining the image sequence may comprise steps S3011-S3013.

In step S3011, for any two background images with a shooting interval less than a preset interval, an IoU between a target detection box in one of the two background images and a target detection box in the other background image is calculated.

The target detection boxes are detection boxes of abnormal vehicles in the background images.

The preset interval can be specified as needed, which is not limited in this embodiment. If the shooting interval between two background images is less than the preset interval, an IoU calculation is performed for the target detection boxes in these two background images; if the shooting interval between two background images is greater than or equal to the preset interval, no IoU calculation is performed for the target detection boxes in these two background images.

In step S3011, the higher the IoU between the target detection boxes in the two background images, the higher the degree of positional overlap between the target detection boxes in the two background images; the lower the IoU is, the lower the degree of positional overlap between the target detection boxes in the two background images.

In S3012, a first target detection box in one of the two background images and a second target detection box in the other background image are determined as detection boxes of a same abnormal vehicle in response to an IoU between the first target detection box and the second target detection box being greater than a second threshold.

The second threshold is a value used to determine whether the target detection boxes in the two background images are detection boxes of the same abnormal vehicle, which can be specified as needed.

If the shooting interval between the two background images is less than the preset interval, and the IoU between the first target detection box in one of the background images and the second target detection box in the other background image is greater than the second threshold, it indicates that the two target detection boxes are detection boxes of the same abnormal vehicle. Otherwise, it is determined that these two target detection boxes are not detection boxes of the same vehicle.

In S3013, the one of the background images and the other background image are added to a same image sequence.

After determining that two target detection boxes in two background images are detection boxes of the same abnormal vehicle, the two background images can be placed into the same image sequence, so that the image sequence corresponds to the abnormal stop event of the same abnormal vehicle.

FIG. 8 is a schematic diagram of an image sequence provided in an embodiment of the present disclosure. Each frame in FIG. 8 represents a background image in the image sequence, and each frame comprises a detection box of a same abnormal vehicle. By arranging multiple background images in chronological order and connecting detection boxes in the multiple background images, it is possible to display a spatio-temporal tube where an abnormal vehicle has experienced an abnormal stop event. The spatio-temporal tube can be used to clearly show the process from the occurrence of an abnormal stop event to the end of the abnormal stop event.

It should be noted that the schematic diagram shown in FIG. 8 is only an example. In detection method of abnormal vehicle provided in the embodiments of the present disclosure, instead of displaying the image sequence as shown in FIG. 8, the image sequence can be represented as an array. As an example, the array can comprise the vertex coordinates of the detection boxes of the same abnormal vehicle in each background image.

It can be understood that if the surveillance video comprises multiple abnormal vehicles, a plurality of image sequences corresponding to the multiple abnormal vehicles can be obtained based on steps S3011-S3013. Thereafter, step S302 can be executed.

In step S302, for each image sequence, a start time and an end time of the image sequence are determined as a start time and an end time of an abnormal stop event corresponding to the image sequence.

Because each image sequence corresponds to an abnormal stop event of an abnormal vehicle, a time corresponding to a starting image frame of the image sequence can be used as the start time of the image sequence, and a time corresponding to the end image frame of the image sequence can be used as the end time of the image sequence, so that the start time and the end time of the abnormal stop event of the abnormal vehicle can be determined.

In some embodiments of the present disclosure, at least one image sequence determined in step S301 may comprise a first image sequence and a second image sequence. The first image sequence corresponds to an abnormal stop event of a first abnormal vehicle, and the second image sequence corresponds to an abnormal stop event of a second abnormal vehicle.

Figure 9:
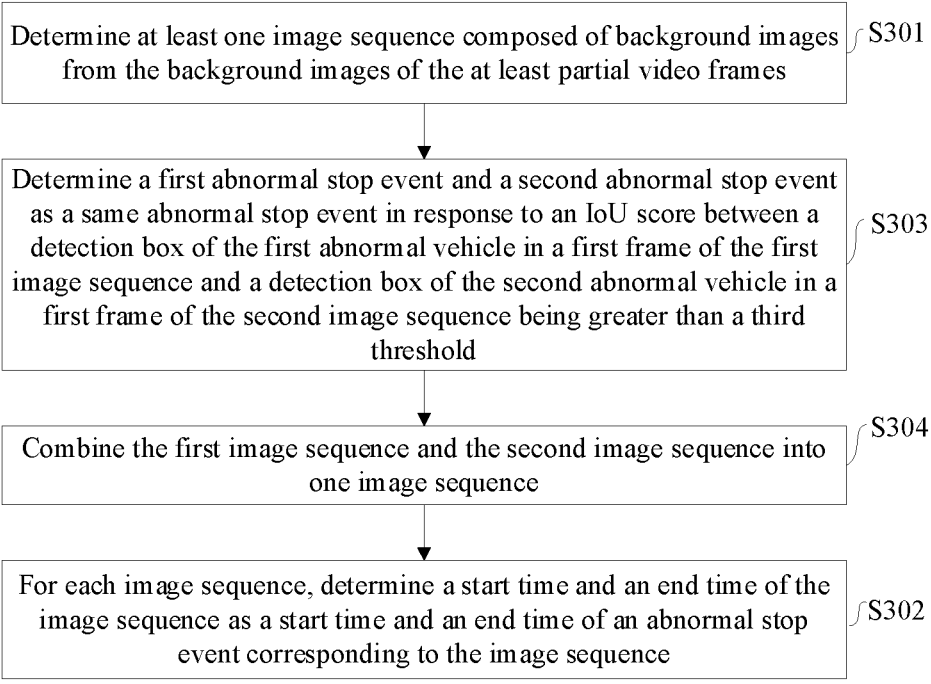
FIG. 9 is a flowchart showing some steps of the detection method of abnormal vehicle provided in some embodiments of the present disclosure.

FIG. 9 is a flowchart showing some steps of the detection method of abnormal vehicle provided by some embodiments of the present disclosure. As shown in FIG. 9. in addition to the steps S301 and S302 described above, the detection method of abnormal vehicle provided by some embodiments of the present disclosure may further comprise steps S303-S304 before step S302.

In S303, a first abnormal stop event and a second abnormal stop event are determined as a same abnormal stop event in response to an IoU between a detection box of the first abnormal vehicle in a first frame of the first image sequence and a detection box of the second abnormal vehicle in a first frame of the second image sequence being greater than a third threshold.

The third threshold is used to determine whether the first abnormal vehicle and the second abnormal vehicle were involved in a collision, a finder-bender or any other type of accident.

If the IoU between the detection box of the first abnormal vehicle in the first frame of the first image sequence and the detection box of the second abnormal vehicle in the first frame of the second image sequence is greater than the third threshold, it indicates that the first abnormal vehicle and the second abnormal vehicle were involved in a collision or a finder-bender accident, and were stopped abnormally due to the same accident. Therefore, the first abnormal stop event and the second abnormal stop event can be identified as the same abnormal stop event.

In S304, the first image sequence and the second image sequence are combined into one image sequence.

If the first abnormal stop event and the second abnormal stop event are the same abnormal stop event, the first image sequence and the second image sequence can be combined into one image sequence. The combined image sequence corresponds to the same abnormal stop event mentioned above.

Specifically, combining the first image sequence and the second image sequence into the same image sequence may be taking a union of the first image sequence and the second image sequence, and sorting background images in the union according to the shooting order of each background image in the image sequence to obtain the combined image sequence.

Through combining the first image sequence and the second image sequence into the same image sequence, different abnormal stop events caused by the same traffic accident can be treated as the same abnormal stop event, which can facilitate subsequent analysis of the causes of the abnormal stop event and the process by which the abnormal stop event occurred.

In practical applications, the vehicle detection model may recognize stationary objects such as manhole covers and road signs as vehicles, and construct image sequences based on the detection boxes of such stationary objects, but these are not true image sequences that can characterize abnormal stop events. An embodiment of the present disclosure further provides a method for eliminating this false detection in response to this situation.

Figure 10:
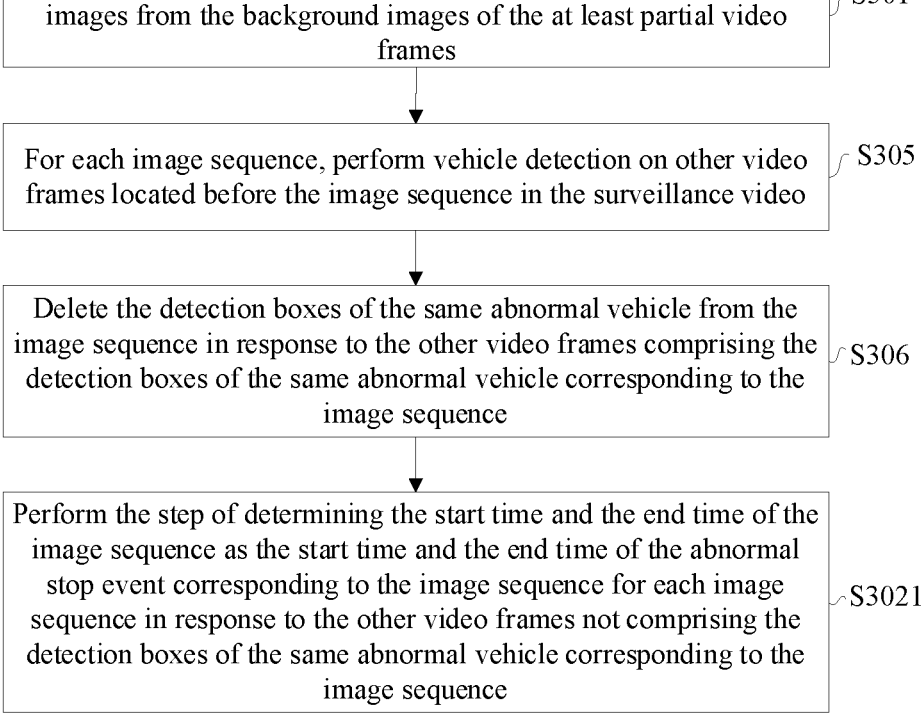
FIG. 10 is a flowchart showing some steps of the detection method of abnormal vehicle provided in some embodiments of the present disclosure.

As an example, FIG. 10 is a flowchart showing some steps of the detection method of abnormal vehicle provided in some embodiments of the present disclosure. As shown in FIG. 10, in order to eliminate false detection, in some embodiments of the present disclosure, the method further comprises steps S305 to S306 after the execution of step S301 described above.

In step S305, for each image sequence, vehicle detection is performed on other video frames located before the image sequence in the surveillance video.

In step S305, the vehicle detection model mentioned in step S103 can be used to detect vehicles in other video frames before the image sequence in the surveillance video, so as to obtain detection boxes of vehicles in the other video frames.

In step S306, the detection boxes of the same abnormal vehicle are deleted from the image sequence in response to the other video frames comprising the detection boxes of the same abnormal vehicle corresponding to the image sequence.

In step S306, it is necessary to determine whether the other video frames comprise detection boxes of the abnormal vehicle corresponding to the image sequence. If the IoUs between the detection boxes of vehicles in the other video frames and the detection boxes of the abnormal vehicle corresponding to the image sequence are greater than a preset threshold, it can be determined that the other video frames also comprise detection boxes of the abnormal vehicle corresponding to the image sequence.

In a condition where the other video frames also comprise detection boxes of the abnormal vehicle corresponding to the image sequence, it indicates that the stationary object corresponding to the detection boxes has always existed. That is, the detection boxes are not detection boxes of an abnormal vehicle, and may be detection boxes of a stationary object such as a road sign that is mistakenly detected as a vehicle. Therefore, the detection boxes can be deleted from the target image sequence to eliminate false detection.

In a case where the detection method of abnormal vehicle comprises step S305, the step S302 may be specifically step S3021.

In step S3021, the step of determining the start time and the end time of the image sequence as the start time and the end time of the abnormal stop event corresponding to the image sequence for each image sequence is performed in response to the other video frames not comprising the detection boxes of the same abnormal vehicle corresponding to the image sequence.

That is, the start time and the end time of the image sequence can be directly identified as the start time and the end time of the abnormal stop event of the abnormal vehicle if the other video frames do not comprise detection boxes of the abnormal vehicle corresponding to the image sequence.

By performing steps S305-S306, the detection method of abnormal vehicle provided in the embodiment of the present disclosure can identify an image sequence that does not correspond to an abnormal vehicle and is formed by false detection, so that an image sequence that can accurately characterize an abnormal stop event of an abnormal vehicle can be obtained.

In the detection method of abnormal vehicle provided in some embodiments of the present disclosure, the modeling algorithm may cause an earlier appearance of an abnormal vehicle in the background images corresponding to the surveillance video frames if a backward background modeling method is used for background modeling, resulting in an earlier start time of the image sequence corresponding to the abnormal stop event of the abnormal vehicle. To address this issue, an embodiment of the present disclosure further provides a method for calibrating the start time of an abnormal stop event.

FIG. 11 is a flowchart showing some steps of the detection method of abnormal vehicle provided in some embodiments of the present disclosure. As shown in FIG. 11, in some embodiments of the present disclosure, in order to avoid that the start time of the image sequence corresponding to the abnormal stop events of the abnormal vehicle is earlier than the actual time, the method may further comprise steps S307-S310 before step S302.

In step S307, for each image sequence, a plurality of video frames corresponding to the image sequence are obtained based on a correspondence between the background images and the video frames.

In this embodiment, each background image corresponds to an original video frame in the surveillance video. Therefore, a plurality of video frames corresponding to the background images in the image sequence can be found based on the one-to-one correspondence between the background images and the video frames.

In step S308, vehicle detection is performed on the plurality of video frames.

In step S308, the vehicle detection model mentioned above can be used to detect vehicles in the video frames corresponding to the background images in the image sequence to recognize the detection boxes in the video frames.

In step S309, a video frame in which the same abnormal vehicle first appears among the plurality of video frames is determined as a target frame based on a detection result.

If 5 video frames are correspondingly determined based on 5 background images in the image sequence, and if the detection box of the abnormal vehicle corresponding to the image sequence appears first in the second video frame, the second video frame is determined as the target frame.

In step S310, a part of the image sequence that was captured earlier than the target frame is deleted.

Since the detection box of the abnormal vehicle first appears in the target frame, it can be determined that the abnormal stop event of the vehicle only occurred from the target frame. Therefore, a part of the image sequence that was captured earlier than the target frame can be deleted to improve the accuracy of the start time of the abnormal stop event.

For example, in the example of step S309, if the second frame is the target frame, the first frame in the image sequence is deleted accordingly. The image sequence comprises four background images after deletion.

In some embodiments of the present disclosure, the detection method of abnormal vehicle may further comprise steps S311 to S312 after step S302.

In step S311, multiple abnormal stop events with start times within a preset period of time are determined as the same abnormal stop event.

In practice, if a traffic accident occurs on the target road and results in an abnormal stop event, it may cause road congestion and other problems due to the previous abnormal stop event within a preset period of time, resulting in the occurrence of abnormal stop events for the following vehicles. Because there is a correlation between the subsequent abnormal stop events and the previous abnormal stop event, the subsequent abnormal stop events and the previous abnormal stop event may be identified as the same abnormal stop event. Therefore, this embodiment can determine multiple abnormal stop events with start times within a preset period of time as the same abnormal stop event in order to facilitate the analysis of the time of abnormal stopping.

In step S312, an earliest start time and a latest end time corresponding to the multiple abnormal stop events are determined as a start time and an end time of the same abnormal stop event.

Because the multiple abnormal stop events can be treated as the same abnormal stop event, the earliest start time corresponding to multiple abnormal stop events can be used as the start time of the same abnormal stop event, and the latest end time corresponding to multiple abnormal stop events can be used as the end time of the same abnormal stop event.

FIG. 12 is a schematic structural diagram of a detection apparatus of abnormal vehicle provided in an embodiment of the present disclosure, which can be understood as a computer device or some functional modules in the computer device described above. As shown in FIG. 12, the detection apparatus 1200 comprises a video obtaining unit 1201, a background image extraction unit 1202, a first vehicle detection unit 1203 and a detection box determination unit 1204.

The video obtaining unit 1201 is used for obtaining a surveillance video of a target road. The background image extraction unit 1202 is used for performing background modeling based on the surveillance video to obtain background images of at least partial video frames in the surveillance video. The first vehicle detection unit 1203 is used for performing vehicle detection processing on the background images. The detection box determination unit 1204 is used for determining detection boxes located on the target road in the background images as detection boxes of abnormal vehicles with abnormal stop events.

In some embodiments of the present disclosure, the detection apparatus further comprises a mask extraction unit. The mask extraction unit is used for performing differential mask extraction processing on the surveillance video to obtain a mask of the target road. Correspondingly, the detection box determination unit comprises a first IoU calculation subunit and a detection box determination subunit. The first IoU calculation subunit is used for determining IoUs between the detection boxes in the background images and the mask. The detection box determination subunit is used for determining detection boxes with IoUs greater than a first threshold as the detection boxes of the abnormal vehicles with the abnormal stop events.

In some embodiment of the present disclosure, the abnormal vehicle detection apparatus further comprises an image sequence construction unit and an abnormal stop event determination unit.

The image sequence construction unit is used for determining at least one image sequence composed of background images from the background images of the at least partial video frames, wherein background images in a same image sequence comprise detection boxes of a same abnormal vehicle. The abnormal stop event determination unit is used for, for each image sequence, determining a start time and an end time of the image sequence as a start time and an end time of an abnormal stop event corresponding to the image sequence, wherein the abnormal stop event corresponding to the image sequence is an abnormal stop event of a same abnormal vehicle corresponding to the image sequence.

In some embodiments of the present disclosure, the image sequence construction unit may comprise a second IoU calculation subunit, a detection box correlation subunit, and an image sequence combination subunit. The second IoU calculation subunit is used for, for any two background images with a shooting interval less than a preset interval, calculating an IoU between a target detection box in one of the two background images and a target detection box in the other background image, the target detection boxes being the detection boxes of the abnormal vehicles. The detection box correlation subunit is used for determining that a first target detection box in one of the two background images and a second target detection box in the other background image are detection boxes of a same abnormal vehicle in response to an IoU between the first target detection box and the second target detection box being greater than a second threshold. The image sequence combination subunit is used for adding the one of the two background images and the other background image to a same image sequence.

In some embodiments of the present disclosure, the at least one image sequence comprises a first image sequence and a second image sequence, the first image sequence corresponding to an abnormal stop event of a first abnormal vehicle, and the second image sequence corresponding to an abnormal stop event of a second abnormal vehicle. In this case, the abnormal vehicle detection apparatus further comprises: an abnormal stop event merge unit and an image sequence combination unit.

The abnormal stop event merge unit is used for determining that a first abnormal stop event and a second abnormal stop event are a same abnormal stop event in response to an IoU between a detection box of the first abnormal vehicle in a first frame of the first image sequence and a detection box of the second abnormal vehicle in a first frame of the second image sequence being greater than a third threshold. The image sequence combination unit is used for combining the first image sequence and the second image sequence into one image sequence.

In some embodiments of the present disclosure, the apparatus further comprises a second vehicle detection unit for, for each image sequence, performing vehicle detection on other video frames located before the image sequence in the surveillance video. Correspondingly, the abnormal vehicle detection apparatus further comprises a detection box deletion unit and an abnormal stop event determination unit.

The detection box deletion unit is used for deleting the detection boxes of the same abnormal vehicle from a target image sequence in response to the other video frames comprising the detection boxes of the same abnormal vehicle corresponding to the image sequence. The abnormal stop event determination unit is used for determining the start time and the end time of the image sequence as the start time and the end time of the abnormal stop event corresponding to the image sequence for each image sequence in a case where the other video frames do not comprise the detection boxes of the same abnormal vehicle corresponding to the image sequence.

In some embodiment of the present disclosure, the abnormal vehicle detection apparatus further comprises a video frame obtaining unit, a third vehicle detection unit, a target frame determination unit, and a deletion unit. The video frame obtaining unit is used for, for each image sequence, obtaining a plurality of video frames corresponding to the image sequence based on a correspondence between the background images and the video frames. The third vehicle detection unit is used for performing vehicle detection on the plurality of video frames. The target frame determination unit is used for determining a video frame in which the same abnormal vehicle first appears among the plurality of video frames as a target frame based on a detection result. The deletion unit is used for deleting a part of the image sequence that was captured earlier than the target frame.

In some embodiments of the present disclosure, the abnormal vehicle detection apparatus further comprises an abnormal stop event combination unit for determining multiple abnormal stop events with start times within a preset period of time as the same abnormal stop event; and determining an earliest start time and a latest end time corresponding to the multiple abnormal stop events as a start time and an end time of the same abnormal stop event.

The apparatus provided in this embodiment can perform the method of any of the embodiments shown in FIGS. 1 to 11 above in a similar manner and can produce a similar beneficial effect, which will not be repeated here.

The present disclosure further discloses a computer device comprising a processor and a memory stored therein a computer program that, when executed by a processor, implement the method according to any one of the embodiments shown in FIGS. 1 to 11.

FIG. 13 is a schematic structural diagram of a computer device according to an embodiment of the present disclosure. Referring to FIG. 13, a schematic structural diagram of a computer device 1000 suitable for implementing the embodiments of the present disclosure is shown.

As shown in FIG. 13, the computer device 1300 may comprise a processing device (e.g., a central processing unit, a graphics processor) 1301, which may perform various appropriate actions and processes according to a program stored in Read Only Memory (ROM) 1302 or a program loaded from storage device 1308 into Random Access Memory (RAM) 1303. In RAM 1303, various programs and data required for the operation of the computer device 1300 are also stored. The processing device 1301, ROM 1302, and RAM 1303 are connected to each other through a bus 1304. An input/output (I/O) interface 1305 is also connected to the bus 1304.

Generally, the following devices can be connected to the I/O interface 1305: input devices 1306 including, for example, a touch screen, a touch pad, a keyboard, a mouse, a camera, a microphone, an accelerometer, a gyroscope, etc; output devices 1307 including a liquid crystal display (LCD), a speaker, a vibrator, etc.; a storage device 1308 such as a magnetic tape, a hard disk, etc; and a communication device 1309. The communication device 1309 enables the computer device 1300 to communicate wirelessly or wirelessly with other devices to exchange data. Although FIG. 13 shows the computer device 1300 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure includes a computer program product, which includes a computer program carried on a non-transitory computer readable medium, and containing program code for executing the method shown in the flowchart. In such an embodiment, the computer program may be downloaded and installed from the network through the communication device 1309, or installed from the storage device 1308, or from the ROM 1302. When the computer program is executed by the processing device 1301, the above functions defined in the method of the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may include, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may include a data signal that is propagated in the baseband or as part of a carrier, carrying computer readable program code. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, including but not limited to wire, fiber optic cable, RF (radio frequency), etc., or any suitable combination of the foregoing.

In some embodiments, a client and a computer device can communicate using any currently known or future developed network protocol such as HTTP (HyperText Transfer Protocol), and can be interconnected by any form or medium of digital data communication, e.g., a communication network. Examples of communication networks include a local area network ("LAN") and a wide area network ("WAN"), the Internet, and end-to-end networks (for example, ad hoc end-to-end networks), as well as any currently known or future developed networks.

The above computer-readable medium may be included in the computer device described above; or it may exist alone without being assembled into the computer device.

The computer-readable medium carries one or more programs that, when executed by the computer device, cause the computer device to perform operations of: obtaining a surveillance video of a target road; performing background modeling based on the surveillance video to obtain background images of at least partial video frames in the surveillance video; performing vehicle detection processing on the background images; and determining detection boxes located on the target road in the background images as detection boxes of abnormal vehicles with abnormal stop events.

The computer program code for executing operations of the present disclosure may be complied by any combination of one or more program design languages, the program design languages including object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or computer device. In the latter circumstance, the remote computer may be connected to the user computer through various kinds of networks, including local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of the units do not constitute a limitation on the units themselves under certain circumstances.

The functions described above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of thereof. More specific examples of the machine-readable storage medium may include electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

The present disclosure further discloses a computer-readable storage medium stored therein a computer program that, when executed by a processor, implement the method according to any one of the embodiments shown in FIGS. 1 to 11 in a similar manner and can produce a similar beneficial effect, which will not be repeated here.

Note that, in this description, the use of relational terms, if any, such as "first" and "second" and the like are used solely to distinguish one from another entity or action without necessarily requiring or implying any actual such relationship or order between such entities or actions. Further, terms "include", "comprise" or their any other variations are intended to encompass non-exclusive composition, so that a process, method, product or device comprising a series of factors may comprise not only these factors, but also other factors that are not listed explicitly, or factors intrinsic to this process, method, product or device. Without limitation, a factor defined by wording "comprise one . . . " does not exclude the existence of other same factors in a process, method, product or device comprising such factor.

The above descriptions are only specific embodiments of the present disclosure, so that those skilled in the art can understand or implement the present disclosure. Various modifications to these embodiments will be apparent to those skilled in the art, and the generic principles defined herein may be implemented in other embodiments without departing from the spirit or scope of the present disclosure. Accordingly, the present disclosure should not be limited to the specific embodiments described herein, but should be accorded the broadest scope consistent with the principles and novel features disclosed herein.

The invention claimed is:

1. A detection method of abnormal vehicle, comprising:
obtaining a surveillance video of a target road;
performing differential mask extraction processing on the surveillance video to obtain a mask of the target road;
performing background modeling based on the surveillance video to obtain background images of at least partial video frames in the surveillance video;

performing vehicle detection processing on the background images; and
determining detection boxes located on the target road in the background images as detection boxes of abnormal vehicles with abnormal stop events, comprising:
determining Intersections over Union (IoUs) between the detection boxes in the background images and the mask; and
determining detection boxes with IoUs greater than a first threshold as the detection boxes of the abnormal vehicles with the abnormal stop events.

2. A non-transitory computer-readable storage medium stored thereon a computer instructions which, when executed by a processor, cause the processor to implement the detection method of claim 1.

3. A detection method of abnormal vehicle, comprising:
obtaining a surveillance video of a target road;
performing background modeling based on the surveillance video to obtain background images of at least partial video frames in the surveillance video;
performing vehicle detection processing on the background images;
determining detection boxes located on the target road in the background images as detection boxes of abnormal vehicles with abnormal stop events;
determining at least one image sequence composed of background images from the background images of the at least partial video frames, wherein background images in a same image sequence comprise detection boxes of a same abnormal vehicle; and
for each image sequence, determining a start time and an end time of the image sequence as a start time and an end time of an abnormal stop event corresponding to the image sequence, wherein the abnormal stop event corresponding to the image sequence is an abnormal stop event of a same abnormal vehicle corresponding to the image sequence.

4. The detection method according to claim 3, wherein the determining the at least one image sequence composed of the background images from the background images of the at least partial video frames comprises:
for any two background images with a shooting interval less than a preset interval, calculating an Intersections over Union (IoU) between a target detection box in one of the two background images and a target detection box in the other background image, the target detection boxes being the detection boxes of the abnormal vehicles; and
determining that a first target detection box in one of the two background images and a second target detection box in the other background image are detection boxes of a same abnormal vehicle in response to an IoU between the first target detection box and the second target detection box being greater than a second threshold; and
adding the one of the two background images and the other background image to a same image sequence.

5. The detection method according to claim 3, wherein the at least one image sequence comprises a first image sequence and a second image sequence, the first image sequence corresponding to an abnormal stop event of a first abnormal vehicle, and the second image sequence corresponding to an abnormal stop event of a second abnormal vehicle, and the detection method further comprises:
before the determining the start time and the end time of the image sequence as the start time and the end time of the abnormal stop event corresponding to the image sequence for each image sequence, determining that a first abnormal stop event and a second abnormal stop event are a same abnormal stop event in response to an IoU between a detection box of the first abnormal vehicle in a first frame of the first image sequence and a detection box of the second abnormal vehicle in a first frame of the second image sequence being greater than a third threshold; and combining the first image sequence and the second image sequence into one image sequence.

6. The detection method according to claim 3, further comprising, for each image sequence:

performing vehicle detection on other video frames located before the image sequence in the surveillance video after the determining the at least one image sequence composed of the background images from the background images of the at least partial video frames;

deleting the detection boxes of the same abnormal vehicle from the image sequence in response to the other video frames comprising the detection boxes of the same abnormal vehicle corresponding to the image sequence, wherein the determining the start time and the end time of the image sequence as the start time and the end time of the abnormal stop event corresponding to the image sequence for each image sequence is performed in response to the other video frames not comprising the detection boxes of the same abnormal vehicle corresponding to the image sequence.

7. The detection method according to claim 3, further comprising:

for each image sequence, obtaining a plurality of video frames corresponding to the image sequence based on a correspondence between the background images and the video frames before the determining the start time and the end time of the image sequence as the start time and the end time of the abnormal stop event corresponding to the image sequence for each image sequence;

performing vehicle detection on the plurality of video frames;

determining a video frame in which the same abnormal vehicle first appears among the plurality of video frames as a target frame based on a detection result; and deleting a part of the image sequence that was captured earlier than the target frame.

8. The detection method according to claim 3, further comprising:

determining multiple abnormal stop events with start times within a preset period of time as the same abnormal stop event after the determining the start time and the end time of the image sequence as the start time and the end time of the abnormal stop event corresponding to the image sequence for each image sequence; and determining an earliest start time and a latest end time corresponding to the multiple abnormal stop events as a start time and an end time of the same abnormal stop event.

9. A computer device, comprising:

a memory; and a processor coupled to the memory, the processor configured to execute the detection method of claim 3.

10. The computer device according to claim 9, wherein the determining the at least one image sequence composed of the background images from the background images of the at least partial video frames comprises:

for any two background images with a shooting interval less than a preset interval, calculating an IoU between a target detection box in one of the two background images and a target detection box in the other background image, the target detection boxes being the detection boxes of the abnormal vehicles; and determining that a first target detection box in one of the two background images and a second target detection box in the other background image are detection boxes of a same abnormal vehicle in response to an IoU between the first target detection box and the second target detection box being greater than a second threshold; and adding the one of the two background images and the other background image to a same image sequence.

11. The computer device according to claim 9, wherein the at least one image sequence comprises a first image sequence and a second image sequence, the first image sequence corresponding to an abnormal stop event of a first abnormal vehicle, and the second image sequence corresponding to an abnormal stop event of a second abnormal vehicle, and the detection method further comprises:

before the determining the start time and the end time of the image sequence as the start time and the end time of the abnormal stop event corresponding to the image sequence for each image sequence, determining that a first abnormal stop event and a second abnormal stop event are a same abnormal stop event in response to an IoU between a detection box of the first abnormal vehicle in a first frame of the first image sequence and a detection box of the second abnormal vehicle in a first frame of the second image sequence being greater than a third threshold; and combining the first image sequence and the second image sequence into one image sequence.

12. The computer device according to claim 9, wherein the processor is further configured to execute the detection method for performing instructions comprising, for each image sequence:

performing vehicle detection on other video frames located before the image sequence in the surveillance video after the determining the at least one image sequence composed of the background images from the background images of the at least partial video frames;

deleting the detection boxes of the same abnormal vehicle from the image sequence in response to the other video frames comprising the detection boxes of the same abnormal vehicle corresponding to the image sequence, wherein the determining the start time and the end time of the image sequence as the start time and the end time of the abnormal stop event corresponding to the image sequence for each image sequence is performed in response to the other video frames not comprising the detection boxes of the same abnormal vehicle corresponding to the image sequence.

13. The computer device according to claim 9, wherein the processor is further configured to execute the detection method for performing instructions comprising:

for each image sequence, obtaining a plurality of video frames corresponding to the image sequence based on a correspondence between the background images and the video frames before the determining the start time and the end time of the image sequence as the start time and the end time of the abnormal stop event corresponding to the image sequence for each image sequence;

performing vehicle detection on the plurality of video frames;

determining a video frame in which the same abnormal vehicle first appears among the plurality of video frames as a target frame based on a detection result; and deleting a part of the image sequence that was captured earlier than the target frame.

14. The computer device according to claim 9, wherein the processor is further configured to execute the detection method for performing instructions comprising:

determining multiple abnormal stop events with start times within a preset period of time as the same abnormal stop event after the determining the start time and the end time of the image sequence as the start time and the end time of the abnormal stop event corresponding to the image sequence for each image sequence; and determining an earliest start time and a latest end time corresponding to the multiple abnormal stop events as a start time and an end time of the same abnormal stop event.

15. A non-transitory computer-readable storage medium stored thereon a computer instructions which, when executed by a processor, cause the processor to implement the detection method of claim 3.

16. The non-transitory computer-readable storage medium according to claim 15, wherein the determining the at least one image sequence composed of the background images from the background images of the at least partial video frames comprises:

for any two background images with a shooting interval less than a preset interval, calculating an IoU between a target detection box in one of the two background images and a target detection box in the other background image, the target detection boxes being the detection boxes of the abnormal vehicles; and determining that a first target detection box in one of the two background images and a second target detection box in the other background image are detection boxes of a same abnormal vehicle in response to an IoU between the first target detection box and the second target detection box being greater than a second threshold; and adding the one of the two background images and the other background image to a same image sequence.

17. A computer device comprising:

a memory; and a processor coupled to the memory, the processor configured to execute a detection method for performing instructions comprising:

obtaining a surveillance video of a target road;

performing differential mask extraction processing on the surveillance video to obtain a mask of the target road;

performing background modeling based on the surveillance video to obtain background images of at least partial video frames in the surveillance video;

performing vehicle detection processing on the background images; and determining detection boxes located on the target road in the background images as detection boxes of abnormal vehicles with abnormal stop events, comprising:

determining Intersections over Union (IoUs) between the detection boxes in the background images and the mask; and determining detection boxes with IoUs greater than a first threshold as the detection boxes of the abnormal vehicles with the abnormal stop events.

* * * * *